United States Patent
Rime et al.

(10) Patent No.: US 9,094,616 B2
(45) Date of Patent: Jul. 28, 2015

(54) METHOD AND SYSTEM FOR IMAGE CAPTURE AND FACILITATED ANNOTATION

(71) Applicant: Vidinoti SA, Fribourg (CH)

(72) Inventors: Laurent Rime, Fribourg (CH); Mathieu Monney, Lausanne (CH); Serge Ayer, Farvagny (CH)

(73) Assignee: Vidinoti SA (CH)

( * ) Notice: Subject to any disclaimer, the term of this patent is extended or adjusted under 35 U.S.C. 154(b) by 296 days.

(21) Appl. No.: 13/653,157

(22) Filed: Oct. 16, 2012

(65) Prior Publication Data

US 2014/0104441 A1    Apr. 17, 2014

(51) Int. Cl.
| | |
|---|---|
| H04N 5/228 | (2006.01) |
| H04N 5/262 | (2006.01) |
| H04N 5/77 | (2006.01) |
| H04N 21/4223 | (2011.01) |
| H04N 21/431 | (2011.01) |
| H04N 21/44 | (2011.01) |
| H04N 21/658 | (2011.01) |
| H04N 21/8358 | (2011.01) |
| H04N 5/272 | (2006.01) |

(52) U.S. Cl.
CPC .............. *H04N 5/2621* (2013.01); *H04N 5/77* (2013.01); *H04N 21/4223* (2013.01); *H04N 21/4312* (2013.01); *H04N 21/44008* (2013.01); *H04N 21/6582* (2013.01); *H04N 21/8358* (2013.01); *H04N 5/272* (2013.01)

(58) Field of Classification Search
CPC . H04N 5/23229; H04N 5/2621; H04N 5/272; H04N 5/77; G06T 2201/0065; G06T 2201/0601
USPC ......... 348/207.1, 222.1, 239, 333.01, 333.02, 348/333.03, 333.04, 333.12; 382/287
See application file for complete search history.

(56) References Cited

U.S. PATENT DOCUMENTS

| | | | |
|---|---|---|---|
| 2006/0045321 | A1 | 3/2006 | Yu |
| 2006/0269098 | A1* | 11/2006 | Ebitani .......................... 382/100 |
| 2007/0024527 | A1 | 2/2007 | Heikkinen et al. |

(Continued)

FOREIGN PATENT DOCUMENTS

| | | |
|---|---|---|
| EP | 1840817 A1 | 10/2007 |
| WO | WO-2005114476 A1 | 12/2005 |
| WO | WO-2011088386 A1 | 7/2011 |

(Continued)

*Primary Examiner* — Lin Ye
*Assistant Examiner* — Chriss Yoder, III
(74) *Attorney, Agent, or Firm* — Blank Rome LLP

(57) ABSTRACT

A method for capturing and processing an image, comprising: capturing a captured image with an image sensor; retrieving steganographic marks hidden in said captured image; processing said captured image based on said hidden marks, so as to generate a processed image; matching the processed image with a reference image from a set of reference images and superimposing elements on the captured image, depending on said reference image. A user device, comprising an image sensor suitable for capturing at least one image and a processor configured to at retrieve hidden marks in said captured image and generating a processed image based on said hidden marks retrieval and annotations processed remotely; the user device is part of a system with a remote server matching the image.

28 Claims, 5 Drawing Sheets

(56) References Cited

U.S. PATENT DOCUMENTS

2008/0300011 A1* 12/2008 Rhoads et al. ............ 455/556.1
2010/0309225 A1* 12/2010 Gray et al. .................. 345/633
2011/0098029 A1    4/2011 Rhoads et al.
2011/0214044 A1*  9/2011 Davis et al. ................. 715/201

FOREIGN PATENT DOCUMENTS

| WO | WO-2011139980 A1 | 11/2011 |
| WO | WO-2011156475 A1 | 12/2011 |
| WO | WO-2012019163 A2 | 2/2012 |

* cited by examiner

METHOD AND SYSTEM FOR IMAGE CAPTURE AND FACILITATED ANNOTATION

FIELD OF THE INVENTION

The present invention concerns a method and system for image capture and facilitated annotation. Moreover the present invention deals with a computer program product suitable for performing the steps of the method presented hereinafter.

DESCRIPTION OF RELATED ART

Document WO2012/019163 discloses a method wherein a still or video image is captured by a cell phone and a rectangular portion corresponding to a video display size is retrieved and then hidden marks within such a portion are identified.

Document WO2011/088386 discloses a way to augment reality of a captured image including hidden data that have been previously included by a content authoring system.

Furthermore US2007/0024527 discloses a method wherein an image, after having been captured by a cell phone and having been made subject to a hidden content inclusion, is sent with such a hidden content to a remote unit.

Similarly, WO2011/156475 discloses a method wherein a hidden content regarding the location is included within an image. Such an image can be captured by a cell phone. The document further discloses overlaying location dependent information onto the captured image once displayed by the cell phone.

In augmented reality solutions, images are commonly captured by a user with a hand-held camera, such as a mobile phone with a camera, and compared with reference images stored in a collection. In case of match, i.e., when the captured image corresponds to one of the previously stored reference images, annotating elements associated with this reference image are retrieved and superimposed over the captured image, resulting in an annotated image.

Since the number of reference images could be very high, storing the complete collection of reference images locally in the user's device is usually not feasible. Moreover, it is often desirable that different users can add, modify and share reference images, resulting in very frequent updates of the collection of reference images. Therefore, the captured images are frequently sent to a remote server where the reference images are stored and where the registration and matching process is carried out.

This commonly used method suffers from a number of drawbacks. Since the user's user device does not know which of the captured images are associated with annotations, it needs to send all the captured images to the remote server, which will then try to match each captured and transmitted image with each reference image in its collection. In case of video images, this results in the useless transmission of a video stream where many frames don't match any reference image and cannot be annotated, thus wasting bandwidth. Moreover, this also results in an increased workload for the remote server which needs to process a large number of irrelevant images that it receives with reference images.

Other known systems require an action from the user to initiate the transmission of captured images to the server, for example by selecting a send command. This requires that the user knows which captured images are likely to be associated with annotations, and to decide which images should be sent.

The workload of the remote server is even more increased if the conditions of capture of the received images are different from the conditions of capture of the reference images. For example, if the image is captured from a different distance and/or angle, the server might need to crop, rotate, and/or otherwise distort the received image in order to make the registration and verify a possible match. Other adjustments might be needed to compensate different zooming factors, brightnesses, contrasts, saturations, white balances, etc in the captured and in the reference images. Recognizing in real time a large number of received captured images requires however an enormous processing power. Moreover, the server does not know in advance how the captured image should be registered, and might need different adjustments—for example, by cropping or resizing in different possible ways the captured image.

It is therefore an aim of the present invention to solve or at least mitigate the above mentioned problems of existing augmented reality systems.

BRIEF SUMMARY OF THE INVENTION

According to one aspect, these aims are achieved by way of a method comprising obtaining captured data representing an image with an image sensor; retrieving steganographic marks hidden in said captured data; image-processing said captured data based on said hidden marks, so as to generate image-processed data representing a modified image; matching said image-processed data with reference data from a set of reference data representing different images; retrieving annotations associated with the matched reference data; and rendering an annotated image based on said image-processed data.

This has the advantage that only those of the captured images which are associated with a hidden mark need to be processed. The hidden mark may be easy to detect, for example by a module within the user's device. Thus, the user's device can sort out those images which include one of those hidden mark and are therefore likely to match a reference image, and send only those images to the remote server, resulting in reduced amount of data to transmit.

Since the steganographic marks are hidden in the image, they are not visible without some special image processing and are therefore easy to integrate in an existing still or video image.

The claimed method has the further advantage that the data representing the captured images are processed using information included in the hidden marks, resulting in image-processed data which can be easier to match with data representing reference images. For example, the hidden marks might be used for determining how the captured image should be resized, cropped, rotated, or otherwise transformed in order to match the corresponding reference image.

In one embodiment, the hidden marks define at least one border of the image which has to be captured.

In one embodiment, the hidden marks can be used to correct geometrical distortions or white balance, contrast, saturation and/or brightness of the image.

This has the advantage of permitting the enhancement of the image resulting quality, once processed. This also improves the quality of capture of the image data, producing for example a more stable, better centred, and otherwise improved image data stream. This makes the process of matching and registration with existing reference image data easier, faster and more robust.

The hidden marks only need to indicate data required for stabilising or otherwise image-processing the image. The annotations themselves depend on the visible content of the image, as determined with computer vision and feature recognition methods. Therefore, the hidden marks can be made tiny and easy to hide. It is possible however to hide some contents used for determining the annotations in the hidden marks as well.

In one embodiment, successive images, such as successive still images or successive frames in a video, are captured with a camera until a hidden mark is retrieved in one of the data representing a captured image. The process comprises trying to match only those captured images that contain hidden marks with said reference images. Data representing images without any hidden mark are not sent to the server and not further processed, avoiding a waste of bandwidth and computational resources.

According to one aspect, these aims are also pursued by way of a user device, comprising an image sensor suitable for capturing data representing at least one image and a processor configured to retrieve hidden marks in said captured image and locally generating a processed image based on said hidden marks retrieval and matching annotations processed remotely.

This has the advantage that the user device does not need the entire processing power that would be required to perform an image matching, but in contrast it can advantageously aid the remote processor with a sort of "pre processing", that reduces the amount of data exchanged back and forth with the remote processor.

In one embodiment, the user device comprises a display suitable for showing images and the processor are configured to aid a user in the hidden marks retrieval and image capture by making aiding signs appear onto the display.

This has the advantage of making the user involved in a process of augmented reality and, at the same time, helps the user device to recognise at least a part of the hidden marks by an external human support without causing further processing burden.

Preferably, in one embodiment the aiding signs are made appear onto the display when an automatic full identification of said hidden marks fails and/or when device detects that the user could move its camera, or modify the zooming factor, or change the capture condition in any other possible way to improve the hidden marks retrieval and/or the registration of the captured image.

In one embodiment, the user device user device locally detects hidden marks, without any need to transmit those images to a remote server to detect hidden marks.

This provides an advantageous reduction of the processing burden, because the hidden marks can be detected locally and without any data transmission. Detection of a hidden mark can be used to decide whether or not the captured image is associated with some annotations, and should be processed locally or in a remote server to retrieve those annotations.

The annotation process can be done within the device, for example using some reference models stored in the device or retrieved from a server, or in a remote server storing reference models and to which the captured image, or a processed version of the captured image, is sent.

The decision to process the image locally or in the server may depend on the hidden mark. Alternatively, the device may try to find a matching reference image locally, and send the captured image, or an image-processed version of the captured image, to a remote server when it fails to find a matching reference image in its local memory.

The aforementioned aims are therefore also obtained by way of a system comprising:

at least one user device with an image sensor suitable for capturing data representing images and with a processor arranged for identifying hidden marks in said data; and a remote server suitable for receiving and transmitting data to said at least one user device, to process at least a part of a captured image transmitted from said user device and to send annotations or annotated images to said user device.

Thus, advantageously, the system allows the user device to display annotated images based on data received from an external server that unburdens the user device from the computational effort of an image matching process.

The identification of hidden marks is performed in at least one of the following domains: frequency domain, time domain and/or space domain.

This has the advantage that the hidden marks can be retrieved even if the image capturing conditions are bad or the image, either still or not, is noisy, with a poor quality or other effects of dilution of the capturing precision are present.

Finally, the above mentioned aims are obtained by way of a computer program product, stored on a non-transitory media support and comprising instructions causing at least one data processor to execute the steps of the method previously disclosed.

Another advantage of the above described features is to reduce the amount of data which is transmitted between the user's device and the remote server.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

For the purpose of clarity, with the noun "annotation" in the present document will be meant at least one word, symbol, smiley, drawing, line, arrow, hypertext, sound, still or video image associated with a particular feature of an image. An annotation is visible or made perceptible during the normal observation of an image; for example the annotation could be superimposed on the annotated image.

Figure 1:
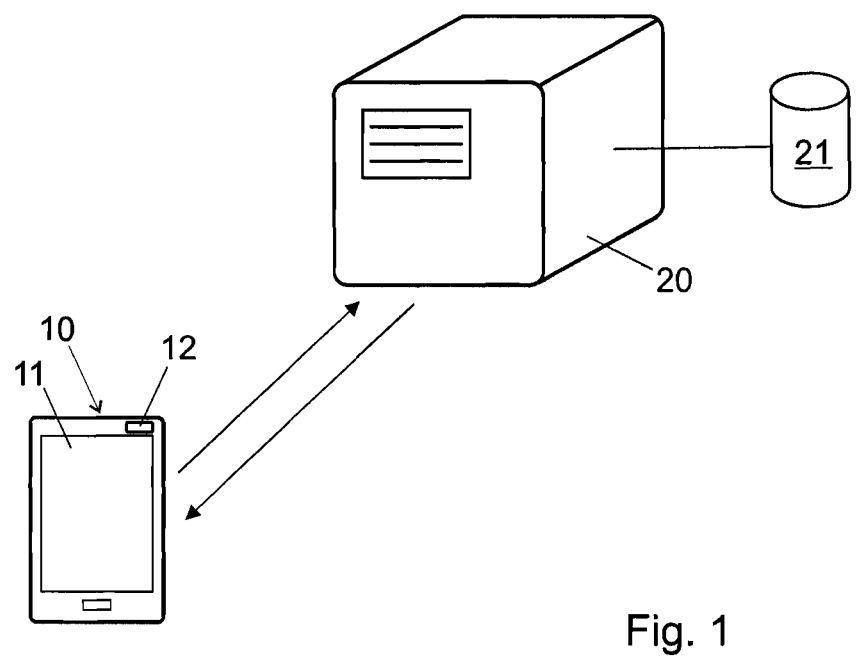
FIG. 1 shows a general view of a system for image capturing and annotation.

As represented in FIG. 1, the system for image capturing and annotation comprises at least one remote server 20 as well as a user device 10, that can be in a non limiting extent a hand-held device such as for example a personal cell phone, a smartphone, a tablet, a computer, a camera with a communication interface, a helmet with a camera, goggles with camera, contact lenses, or other devices embarked on a person and comprising a sensor for capturing visible, infrared and/or ultraviolet light, as well as a display. The remote server 20 and the at least one user device 10 are suitable for exchanging data representing images and other data. Even though in the present description we refer to a remote server, it can be equivalently substituted by any remote processing system capable of performing image processing and data transceiving, including for example a cloud server or a plurality of servers.

In detail, the user device 10 comprises a display 11 and an image sensor 12 capable of capturing still and/or video images (including for instance, slides, presentation, portraits, advertisements, spots). The user device comprises also a processor 13 capable of processing data representing images, and a memory 14 configured to store the images. The processor 13 can execute a suitable program code stored in memory 14. A transceiver 15 such as a WIFI and/or cellular interface is available for connecting the device 10 to a remote server 20 or cloud server over a network such as the Internet, and for wirelessly exchanging data with the remote server 20. This transceiver will be adapted according to the actual category of user device 10 used, and will be designed so as to comply if possible with known data transceiving standards.

The program code stored in memory 14 and executed by the processor 13 in user's device 10 could include for example an application software, or app, that can be downloaded and installed by the user in the user's device 10. The program code could also include part of the operating code of the device 10. The program code could also include code embedded in web page or executed in a browser, including for example Java, JavaScript, HTML5 code, etc. The program code may be stored as a computer program product in a tangible apparatus readable medium, such as a Flash memory, a hard disk, or any type of permanent or semi-permanent memory.

The server 20 includes a storage 21 with a database such as a SQL database, a set of XML documents, a set of images, etc, for storing a collection of reference images, such as 2D and/or 3D reference images, and/or one or a plurality of global models, and a processor, such as a microprocessor with computer code for causing the microprocessor to perform the operations needed in the annotation method.

We will now describe an example of method.

At least some of the still images or video frames that are captured by the image sensor 12 comprise some hidden marks 30 also indicated in the present description with the synonym steganographic marks, which can be used to image-process the captured image. Those hidden marks can be extracted by a suitable software module executed by the processor 13 in the user's device 10 processing an image while the human eye cannot notice them. Thus, a lot of information can be stored in steganographic marks without making the reader or user recognise a difference with an image without those marks.

Figure 2:
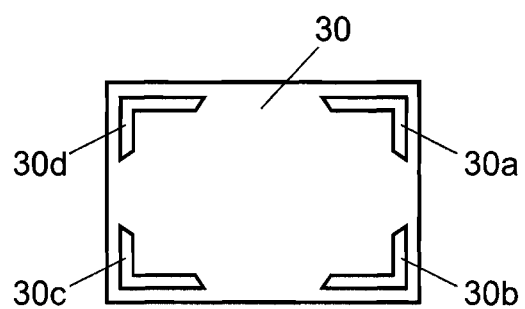
FIG. 2 shows a detail of a part of the system of FIG. 1.
Figure 2:
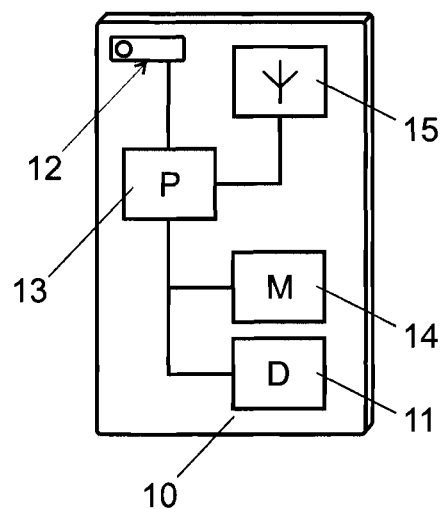

For example, and as represented in FIG. 2, some marks detectable by the system 1 could represent alignments marks indicating corners 30a-30d of an image 61, such as a still or video image projected on a screen, on a monitor, or printed on paper. Some marks could also represent a test pattern indicating for example other parameters of the image, such as a reference grey level for adjusting the brightness and/or white balance, lines for correcting geometric distortions, etc. Some hidden marks may also be included just to indicate that the image is associated with annotations available from a remote server 20. For example, some hidden marks may include a hidden hyperlink.

Various steganographic methods are known in the prior art and can be used for hiding those different types of marks. For example, the marks can be included in a plurality of subsequent frames that the human eye or brain averages; or included as unnoticeable variations of the image in the time and/or spatial and/or frequency domain.

The hidden marks thus not only can be hidden through manipulations or displacements of pixels in the space domain, but also by manipulation of pixels in successive frames in the time domain. Some hidden marks may be revealed only through a Fourier transformation of the image data, such as a DFT (Discrete Fourier Transform) or DCT (Direct Cosine Transform) methods. Those methods of hiding marks can be mixed up together so as to provide hidden marks more robust to detection.

In one example, a DCT technique is used for hiding the marks into the image, and for retrieving the marks. In order to hide the marks, each image is cut into a plurality of blocks. A Discrete Cosine Transform is then applied independently on each block. In one embodiment, three different kinds of data are hidden into three blocks so that those three blocks can be used as geometric insights in order to retrieve the image plane later on. In order to hide those three different information into three selected blocks, one can cleverly modify the least significant bit (LSB) bits of the least significant DCT block. Only 2 bits of information would need to be embedded into each blocks to recover the plane normal in the space, and therefore to correct any keystone introduced by a camera where its plane is not parallel to the projection screen plane. Additional information could be hidden by modifying more blocks and/or more bits in each block.

The hidden marks can also be "extended hidden marks". Let's assume the case of a newspaper with an advertisement; in this case, it could be difficult to recognise steganographic signs correctly, due to the potential small dimension of the image, lack of texture of the image, and the poor quality associated thereto. Thus, the extended hidden mark can be hidden not only in the image to capture itself, but also, at least in part, in its surroundings, including textured areas surrounding the image to be captured. In this way, the hidden data contained in the image to be captured is only a part of the full hidden data which actually includes the above named extended hidden marks.

Figure 3:
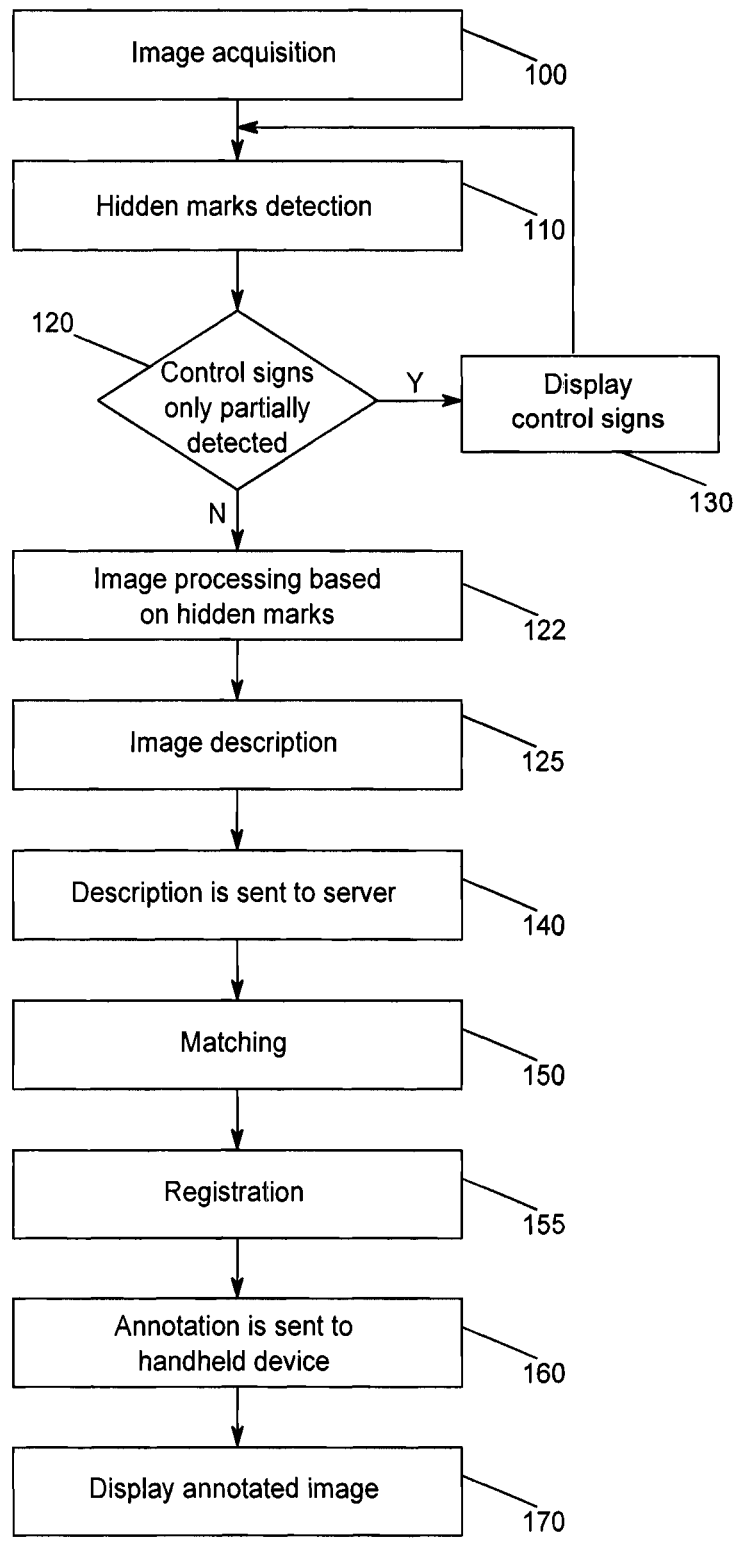
FIG. 3 shows a flow chart containing parts of the algorithm performed by the system.

As shown in FIG. 3, the system performs a method that leads to an eased image focusing, deblurring, stabilization, cropping and/or front-planning with the possibility to annotate data on the images captured by the image sensor 12 while reducing as much as possible the amount of data which is exchanged between the user device 10 and the server 20. The detailed operations of the algorithm will be discussed in detail hereinafter. Various steps of the algorithm can conveniently be executed by a computer program stored in a memory in the user device 10 or in the server 20.

The first step 100 of the algorithm performed by the system is to capture data representing an image, either a still image, one frame of a video, or a complete video, by way of the user device 10 through the image sensor 12. The captured data is stored in the memory 14 of the user device 10.

Then the following step 110 consists in the detection of hidden marks 30 in the captured data. During this step, a module executed by the processor 13 of the user device 10 processes the captured image so as to extract hidden marks (if available), therefore decoding the data which is contained therein.

Figure 4:
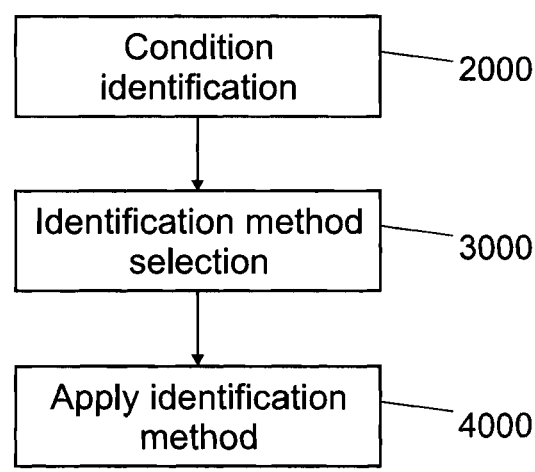
FIG. 4 shows a flow chart describing a hidden mark identification method choosing.

In detail, as disclosed in FIG. 4, the steganographic marks on the image can be extracted according to a plurality of different methods. This means that the module executed by the processor 12 of the user device 10 can choose among a plurality of methods in order to retrieve the hidden mark recognition automatically. As shown in FIG. 4, the first step for choosing the hidden marks recognition method is a condition identification step 2000; said condition identification can depend on focusing distance of the image sensor 12, and or a scene/mode either selected by the user or automatically detected by the processor 13 of the user device 10, and/or location of the user device detected with a positioning sensor, and/or radio signals received by the user device, for example radio signals received from one object in the scene.

The at least one condition retrieved is therefore used to automatically select a hidden mark identification method 3000 among a plurality of identification methods which could by executed by program code stored within the memory of the user device.

A further step is therefore to apply (block 4000) the chosen identification method to the captured image in order to extract the data contained within the steganographic marks.

The user device 10 can identify other steganographic marks in data represented the captured image(s), which could be used in order to better realize the matching and registration process. For example, steganographic marks associated with an image could indicate a date, a time, geolocalization, image type, identification and in general any kind of information that can be stored in the image as a steganographic message. This additional information can be retrieved in the user device 10, or possibly in the remote server 20, in order to help the process to recognize the image, and/or to change the annotations depending on those marks. For example, a same image may be associated with different annotations depending on those additional steganographic marks.

Sometimes, due to the particular position or distance or features of the image or images to be captured, the processor 13 of the user device 10 detect only a part of the whole set of hidden marks. In this case, which corresponds to the decision block 120, exit "yes", the program executed by processor 13 is configured to display an aiding sign on the display of the user device, or in the viewfinder, or an audible signal, to prompt the user to move or rotate his device in a given direction in order to capture all the hidden marks and hopefully the whole image to annotate (block 130, "display control signs"). The user may also be prompted to refocus, adjust brightness, or make other adjustments in order to improve the capture of the hidden marks and of the whole image. The adjustment in focus, brightness and/or colour can also be electronically controlled, whereas the setting value depends on the detected hidden mark.

Other aiding signs may appear onto the display 11 or be otherwise given to the user to assist him in the capture. For example, the detected borders of an image, or the borders of some elements of the image, might be outlined. Detected elements might be otherwise highlighted based on hidden marks. A logo, a video, an advertising may be displayed or otherwise rendered to the user, to indicate that hidden marks have been detected so that the user knows that he is currently capturing an image of an object which has hidden marks and which is therefore probably associated with annotations. Therefore, the user knows that the recognition process already started learn something useful about the scene. In the case where the hidden marks encode some information about the type of object to be recognized (e.g. 2D object, 3D object, face, building, etc), an animation or illustration related to the detected type could be presented to the user.

Signals for helping the users can be displayed or otherwise presented during the complete duration of acquisition, to help the user in pointing the user device 10 constantly in the same position, without moving the device away from the image to be recognised. The message that can be provided to the user can be for instance a device vibration, a video transmitted by the processor to the display, a message overimposed to the image, graphic symbols such as lines, arrows etc for indicating if the camera is oriented correctly or in which direction it should be moved.

In step 122, the data captured during step 100 is image-processed by a software module in the user device 10 so as to generate an image-processed data corresponding to a modified image which can be for example and in a non limiting extent, more focused, realigned, resized or cropped, zoomed, adapted in colour tones, colours converted, denoised, deblurred, front-planed or rotated. According to one aspect, this image processing depends on the hidden marks detected during step 110. For example, if the hidden marks indicate the corners of a rectangular image to annotate, the image processing performed during step 122 may include cropping all areas outside of those corners, so as to generate a modified image data including only the area of interest. The image processing may also include correction of geometric or optical deformations due for example to the orientation of the camera generating trapezoids instead of rectangles, and/or due to the lens of the camera. If the hidden mark include or otherwise allow to compute a reference grey or other reference colours, the image processing may compute a colour corrected image data, for example an image where the white balance, the saturation, the contrast, and/or the brightness, etc are corrected.

In step 125, an image description based on the processed image data is computed by a suitable software module in the user device 10. The image description may include for example a list of descriptors of local features of the image, for example features with a high entropy and reliably identifying an image. Different types of features may be used, as known in computer vision technology. A description of those features is then computed. Since the descriptors are preferably computed after image processing at step 122, more reliable detectors will be computed, avoiding for example descriptors for areas outside of the zone of interest.

In step 140, the list of descriptors is sent to the server 20, possibly with additional data related to the localization of the user as indicated by a GPS receiver, by signals received from captured objects, choices entered by the user, and/or data retrieved from the captured data, including already decoded steganographic marks. The server 20 then tries to find a matching reference image in a collection of reference images, including 2D or 3D models. The selection of reference images to which the captured data should be compared could be restrained by using the additional information transmitted by the user device, and/or depending on the time if some reference images have a limited duration. The matching is faster if it can be based on description of features, instead of being based on the whole image.

Different algorithms may be used for matching the captured data with reference data. For example, a first algorithm may be used for matching faces, a different algorithm may be used for matching captured data with a 2D reference image, a third algorithm may be used for matching captured data with a 3D model, etc. The choice of the best algorithm may be based, at least in part, on information retrieved from the detected steganographic mark. For example, one steganographic mark on an element in a scene could indicate that a 3D model of the scene is available, and be used by the server for selecting a suitable algorithm based on 3D models.

In step 150, once one or a plurality of matching reference images is found, the server 20 performs the registration for aligning the captured image with the matching reference image or model, and determining the position of the camera 10 in the coordinate system of the reference image.

In step 160, a list of annotations associated with the matching reference image is retrieved from storage 21 by a program module executed by the server 20, along with a position or associated feature of the corresponding image. Those annotations are sent to the user device 10. Alternatively, an annotated image is sent.

In step 170, the annotations are added to the previously image-processed data, resulting in data representing a processed image 53 with annotations 530, which can be in the form of text, video, images, sounds, or hyperlinks. The modified and annotated image is then displayed on display 11.

With the present method the image(s) that are captured by the user device are as much as possible automatically transformed so as to appear as if they were taken in a co-planar direction, without noise and with the right colours, with a correct zoom and without rotation or unnecessary parts. In such a way, taking images, streamed videos, presentations, advertisements or parts of movies is eased and enhanced in the final quality without involving the user in particularly complex operations or user device positioning, guiding him in a more augmented reality fullness. Moreover, this makes the process of matching the captured image with the reference image faster and more robust.

Figure 5:
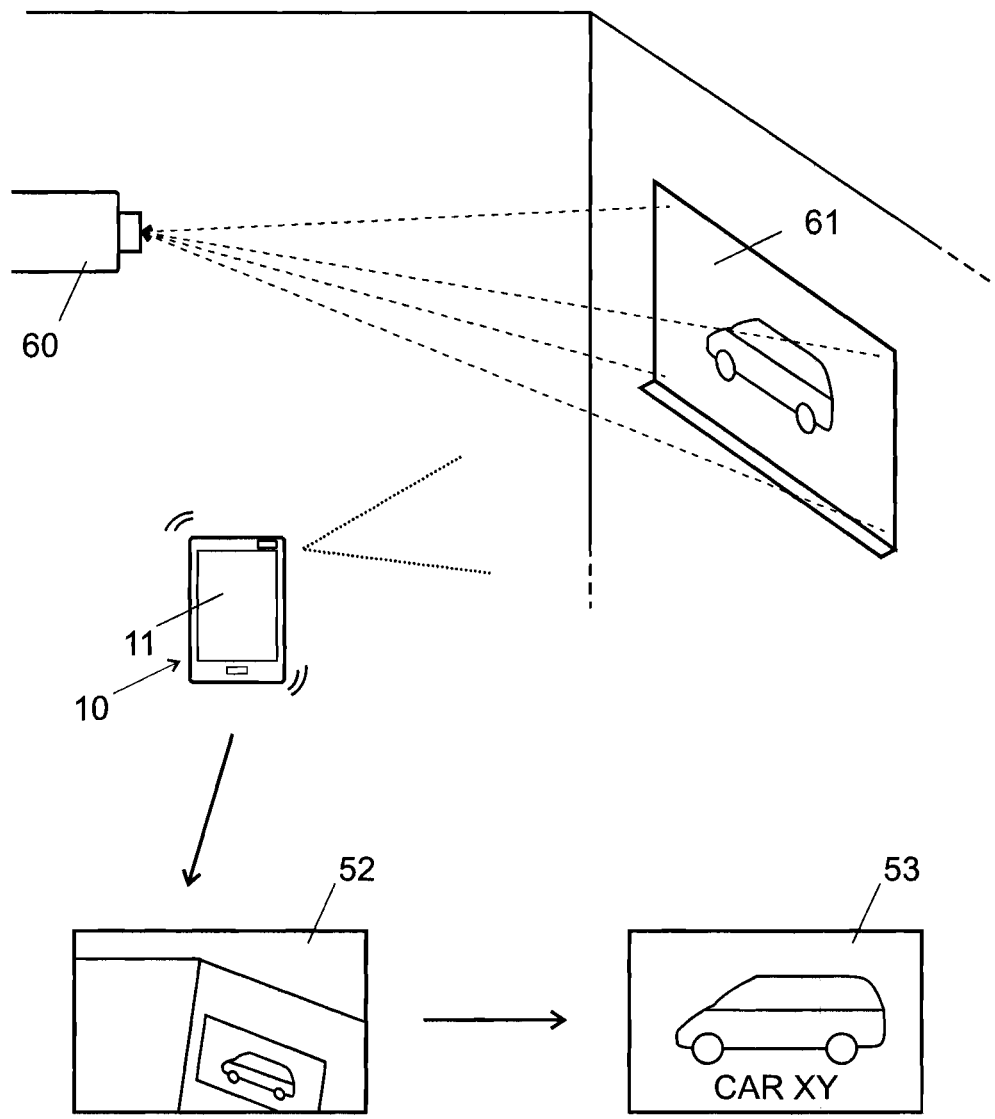
FIG. 5 shows an example of use of the method and system.

An example of possible use of the systems and methods will now be described and illustrated with FIG. 5. In this example, an image 61 is projected against a wall by a beamer 60. The image could be for example a still image such as a photograph, a text file, a presentation, a movie, etc. It includes some hidden marks steganographically hidden into the image.

A user captures the presentation—either a still picture or a video—with his user device 10. However, due to the misalignment between the beamer 60 and the device 10, the image of the presentation 61 in the captured image 52 is not rectangular, but includes various geometrical deformations such as keystone or tombstone deformations. Other optical deformations may be due to the lens of the beamer 60, to the lens of the camera in device 10, to a surface of projection which is not flat or not perpendicular to the line of projection from the beamer, etc. Moreover, it is difficult for a user to capture a stable image with a user device, so that the captured image might be shaking and include a lot of irrelevant area around the image of the presentation. The captured image might also have some white-balance and other colour problems.

In order to improve the quality of the capture, as described, the program executed by the processor in the user's device detects the steganographic marks hidden into the data representing the captured image 52, and use those marks as instructions for image-processing this data, thus generating a modified data representing an image which might be stabilized, cropped, geometrically adjusted, or otherwise improved. For example, if the hidden marks indicate the four corners of a rectangular surface, the program might crop all area outside of those four corners, and redress the inner part to make it rectangular.

Since the program executed in user device has detected those hidden marks, it also knows that the captured image is associated with annotations. The annotations or annotated image data are then retrieved either from a local memory in the user device 10, or from a remote server 20, using the previously described method. An annotated and modified image 53 is then generated and displayed on display 11 of the user device 10.

Some hidden marks might also be associated with particular elements of a complete image. For example, an identification of person or object can be hidden as steganographic mark associated to this element, and used by the program in the user device 10 for tracking this person or object on successive frames of a video.

The various operations of methods described above may be performed by any suitable means capable of performing the operations, such as various hardware and/or software component(s), circuits, and/or module(s). Generally, any operations described in the application may be performed by corresponding functional means capable of performing the operations. The various means, logical blocks, and modules may include various hardware and/or software component(s) and/or module(s), including, but not limited to a circuit, an application specific integrate circuit (ASIC), or a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. A server may be implemented as a single machine, as a set of machine, as a virtual server, or as a cloud server.

As used herein, the term "annotation" encompasses a wide variety of possible elements, including for example text, still images, video images, logos, image layers, sounds and/or other elements that could be superimposed or otherwise added to an image.

As used herein, the term "determining" encompasses a wide variety of actions. For example, "determining" may include calculating, computing, processing, deriving, investigating, looking up (e.g., looking up in a table, a database or another data structure), ascertaining, estimating and the like. Also, "determining" may include receiving (e.g., receiving information), accessing (e.g., accessing data in a memory) and the like. Also, "determining" may include resolving, selecting, choosing, establishing and the like.

Capturing an image of a scene involves using a digital camera for measuring the brightness of light that reaches the image sensor of the camera.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A software module may consist of an executable program, a portion or routine or library used in a complete program, a plurality of interconnected programs, an "apps" executed by many smartphones, tablets or computers, a widget, a Flash application, a portion of HTML code, etc. A storage medium may be coupled to a processor such that the processor can read information from, and write information to, the storage medium. In the alternative, the storage medium may be integral to the processor. A database may be implemented as any structured collection of data, including a SQL database, a set of XML documents, a semantical database, or set of information available over an IP network, or any other suitable structure.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for capturing and processing an image, comprising:
   capturing data representing an image of an image which has hidden steganographic marks, with an image sensor;
   retrieving said steganographic marks hidden in said captured data;
   image-processing said captured data based on said hidden steganographic marks, so as to generate image-processed data representing a modified image;
   matching said image-processed data with reference data from a set of reference data representing different images;
   rendering an annotated image based on said image-processed data.

2. The method of claim 1, said image which has hidden steganographic marks being a video image.

3. The method of claim 1, said image which has hidden steganographic marks being a still image.

4. The method of claim 1, wherein said steganographic marks include alignment marks defining limits of an interesting portion to capture, said step of image-processing including a step of cropping and/or resizing said image so as to align said processed image depending on said marks.

5. The method of claim 1, said step of image processing including correcting geometrical or optical distortions based on said hidden marks.

6. The method of claim 1, said step of image-processing including adapting colours based on said hidden marks.

7. The method of claim 1, said step of image-processing including adapting a contrast and/or saturation and/or brightness based on said hidden marks.

8. The method of claim 1, comprising the capture of data representing a plurality of captured images until a hidden mark is retrieved in one of said captured images, and trying to match only data said image-processed data that contain hidden marks with said reference images.

9. The method of claim 1, wherein said image is captured with an user device, wherein said steps of retrieving steganographic marks and processing said captured image are performed in said user device, and wherein said matching is performed remotely.

10. The method of claim 9, further comprising computing descriptors of local features of said captured image in said user device.

11. The method of claim 1, comprising a step of using said hidden marks for determining instructions given to a user.

12. The method of claim 11, said instructions comprising instructions to move said image sensor.

13. The method of claim 1, comprising a selection of one method among a plurality of methods for retrieving said steganographic marks, wherein said selection depends on at least one of the following condition:
   focusing distance of an image sensor,
   scene/mode either selected by the user or automatically detected
   radio signals received from one element of the scene;
   location.

14. The method of claim 1, comprising a selection of one method among a plurality of methods for matching said image-processed data with reference data, wherein said selection depends on information retrieved from one said steganographic mark.

15. A method for capturing and processing an image, comprising:
   capturing data representing an image of an image which has hidden steganographic marks, with an image sensor;
   retrieving said steganographic marks hidden in said captured data;
   image-processing said captured data based on said hidden steganographic marks, so as to generate image-processed data representing a modified image;
   sending the image-processed image to a remote server;
   receiving from said remote server either an annotated image or a set of annotations;
   displaying said annotated image or the image-processed image with said annotations.

16. The method of claim 15, further comprising computing descriptors of local features of said captured image.

17. The method of claim 15, comprising a step of using said hidden marks for determining instructions given to a user.

18. The of claim 17, said instructions comprising instructions to move said image sensor.

19. The method of claim 15, comprising a selection of one method among a plurality of methods for retrieving said steganographic marks, wherein said selection depends on at least one of the following condition:
   focusing distance of an image sensor,
   scene/mode either selected by the user or automatically detected
   radio signals received from one element of the scene;
   location.

20. A device comprising an image sensor suitable for capturing data representing an image of an image which has hidden steganographic marks image and a processor programmed to at least partially retrieve hidden steganographic marks in the captured data and generating image-processed data based on said hidden steganographic marks retrieval and generating an annotated image based on the image processed data and annotations received from a remote server.

21. The device of claim 20, comprising a transceiving stage suitable for transmitting either said captured data or features retrieved from said captured to a remote server, and for receiving said annotations from said server.

22. The device of claim 20, wherein the processing comprises one or several among focusing, zooming, cropping, white balancing, contrasting or colouring said data.

23. The device of claim 20, comprising a display suitable for showing images and wherein said processor is programmed to aid a user in the hidden marks retrieval by making aiding signs appear onto the display.

24. The device of claim 20, wherein said aiding signs are made appear onto the display when some required hidden marks are outside the image, so as to indicate to the user how to move the device.

25. The device of claim 20, wherein said aiding signs are made appear onto the display to outline the border of the image of the border of an element.

26. A system comprising:
   at least one device with an image sensor suitable for capturing data representing an image of an image which has hidden steganographic marks, and for identifying hidden marks in said image in said image represented in the data; and a remote server for receiving and transmitting data to said at least one device, to process at least a part of a captured image transmitted from said device and to send annotations or annotated images to said device.

27. A computer program product, stored on a non-transitory media support and comprising instructions causing at least one data processor to execute the steps of the method according to claim 1.

28. A method for capturing and processing an image, comprising:
  capturing data representing an image of an image which has hidden steganographic marks, with an image sensor;
  retrieving steganographic marks hidden in said captured data representing the image of an image;
  image-processing said captured data based on said hidden steganographic marks, so as to generate image-processed data representing a modified image;
  matching said image-processed data with reference data from a set of reference data representing different images;
  rendering an annotated image based on said image-processed data,
  wherein said steganographic marks include alignment marks defining limits of an interesting portion to capture, said step of image-processing including a step of cropping and/or resizing said image so as to align said processed image depending on said marks.

* * * * *